United States Patent [19]
Ito et al.

[11] Patent Number: 5,460,505
[45] Date of Patent: Oct. 24, 1995

[54] INJECTION MOLDING APPARATUS

[75] Inventors: Susumu Ito; Koichi Nishimura, both of Oshino, Japan

[73] Assignee: Fanuc Limited, Minimitsuru

[21] Appl. No.: 185,951

[22] PCT Filed: May 25, 1993

[86] PCT No.: PCT/JP93/00691

§ 371 Date: Jan. 18, 1994

§ 102(e) Date: Jan. 18, 1994

[87] PCT Pub. No.: WO93/24297

PCT Pub. Date: Dec. 9, 1993

[30] Foreign Application Priority Data

May 29, 1992 [JP] Japan ..................... 4-161646

[51] Int. Cl.[6] ............................. B29C 45/20; B29C 45/84
[52] U.S. Cl. ......................... 425/151; 425/173; 425/567
[58] Field of Search ........................ 425/151, 169, 425/171, 173, 567, 569, 574

[56] References Cited

U.S. PATENT DOCUMENTS 3,728,057 4/1973 Grundmann et al. .................. 425/169
4,950,144 8/1990 Watanabe et al. .................... 425/171

FOREIGN PATENT DOCUMENTS 0055464 7/1982 European Pat. Off. .
57-56843 12/1982 Japan .
58-133416 9/1983 Japan .
4-339622 11/1992 Japan .

OTHER PUBLICATIONS

Patent Abstracts of Japan, vol. 7, No. 203 (M–241) (1348) 8 Sep. 1983 & JP–A–58–101 023 (Matsushita Denki Sangyo K.K.) 16 Jun. 1983.
Patent Abstracts of Japan, vol. 14, No. 231 (M–0974) (4174) 16 May 1990 & JP–A–02–060 723 (Fanuc Ltd) 1 Mar. 1990.
Patent Abstracts of Japan, vol. 14, No. 237 (M–0976) (4180) 21 May 1990 & JP–A–02–063 710 (Fanuc Ltd) 5 Mar. 1990.

*Primary Examiner*—James P. Mackey
*Attorney, Agent, or Firm*—Staas & Halsey

[57] ABSTRACT

An injection molding apparatus which enables easier monitoring of the nozzle touch condition from the outside of a clamping unit (70). A stationary platen (10) of the clamping unit (70) is furnished with monitoring holes (16a, 16b). The monitoring holes (16a, 16b) extend from at least either of the front and rear sides of the clamping unit (70) toward a locating hole (12) into which a sprue bush (51) of dies is located. The monitoring holes (16a, 16b) may be interlocked with shutters (22a, 22b) which are opened or closed in response to open or close motion of the purge shield (20). Furthermore, it is possible to provide windows (34a, 34b) in a purge shield (30) so as to allow an operator to look into the monitoring holes (16a, 16b) therethrough.

6 Claims, 4 Drawing Sheets

INJECTION MOLDING APPARATUS

TECHNICAL FIELD

The present invention relates to an injection molding apparatus, more particularly to an injection molding apparatus equipped with a clamping and an injection units disposed opposite to each other.

BACKGROUND ART

In the injection molding apparatus equipped with a clamping and an injection units disposed confronting each other, injection is performed by causing the tip of the nozzle of the injection unit to abut against the dies fixed to the clamping unit. When the dies have been changed, the cylinder assembly of the injection unit has been changed, or when the injection unit has been turned for change of the parts, it is necessary to check, at the time of the nozzle touching operation, whether the tip of the nozzle of the injection unit accurately abuts against the sprue bush of the dies while operating the injection unit manually or at a low speed.

For this purpose, the abutment between the sprue bush and the injection nozzle tip, i.e. the condition of nozzle touch, is conventionally monitored through a clearance formed in the vicinity of the purge shield by an operator looking into the front side of the stationary platen (a surface on the side of the injection unit) from the front side of the clamping unit. However, a point where the sprue bush and the injection nozzle tip abut each other tends to locate in a dark place far inward from the front side of the stationary platen. Thus, it has been difficult for the operator to accurately monitor the condition of abutment.

This difficulty increases as the size of the injection molding apparatus increases, since the size of the stationary platen also increases accordingly. Thus, there has been a possibility of having the resin leaked outside due to improper nozzle touch.

DISCLOSURE OF INVENTION

The present invention provides an injection molding apparatus rendering easier for an operator to monitor abutting condition between the sprue bush and the injection nozzle tip.

According to the present invention, an injection molding apparatus comprises a clamping unit having a movable platen and a stationary platen. The stationary platen has a locating hole into which the sprue of dies is to be located, and at least one monitoring hole extending from the side thereof toward the locating hole, so that the locating hole can be monitored from the side of the clamping unit through this monitoring hole.

The direction of the monitoring hole is determined so that an operator is allowed to monitor the locating hole from at least either of the front and rear sides of the clamping unit.

The monitoring holes may be provided with shutters, the shutters being interlocked with a purge shield so that the monitor hole is opened together with the purge shield when the purge shield is opened. This shutter prevents the gas or resin from blowing off directly toward an operator during the purge operation.

Furthermore, a window may be provided in the purge shield covering the front side of the stationary platen. The window of the purge shield and the monitoring holes are designed to cooperatively allow the operator to monitor the locating hole even during the purge operation of the clamping unit.

BEST MODE FOR CARRYING OUT THE INVENTION

Figure 1:
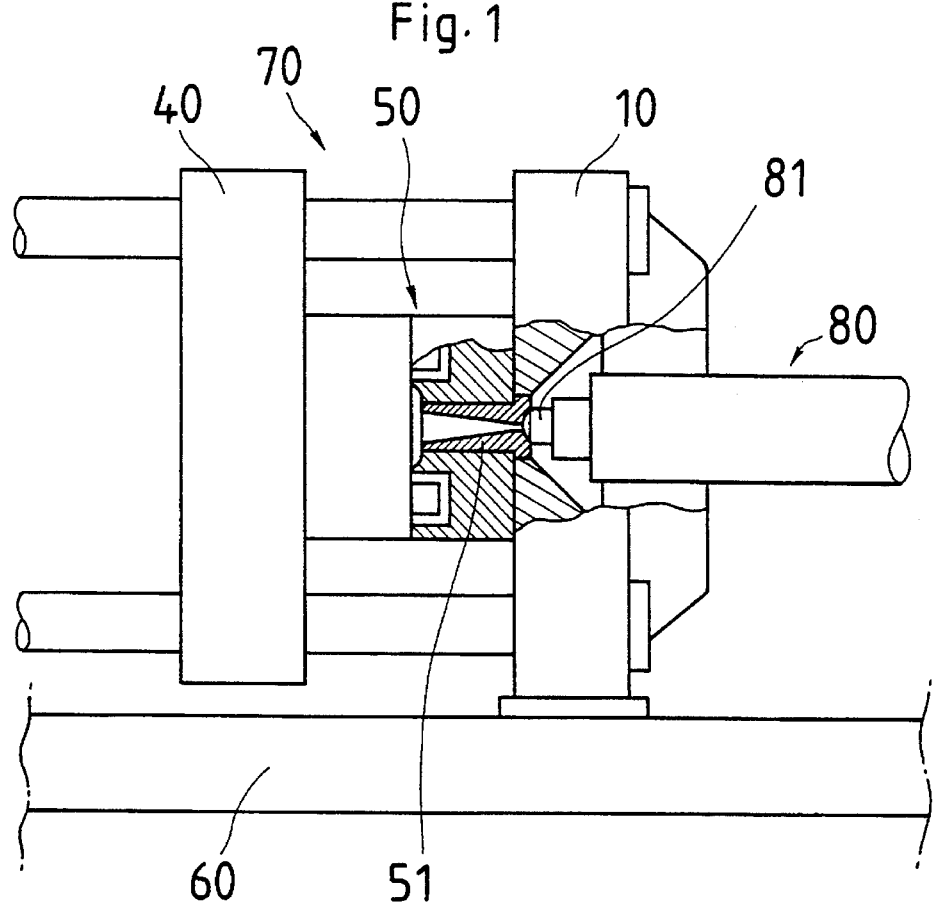
FIG. 1 is a partly sectional side view showing an injection molding apparatus in accordance with a first embodiment of the present invention.

An injection molding apparatus in accordance with the first embodiment of the present invention will be explained with reference to FIGS. 1–4. In FIG. 1, a clamping unit 70 and an injection unit 80 are disposed on a base 60 confronting each other. The clamping unit 70 includes a movable platen 40, a stationary platen 10 and dies 50 disposed therebetween. An injection nozzle 81 of the injection unit 80 has a tip to be brought into contact with a sprue 51 of the dies 50 when performing injection molding.

Figure 2:
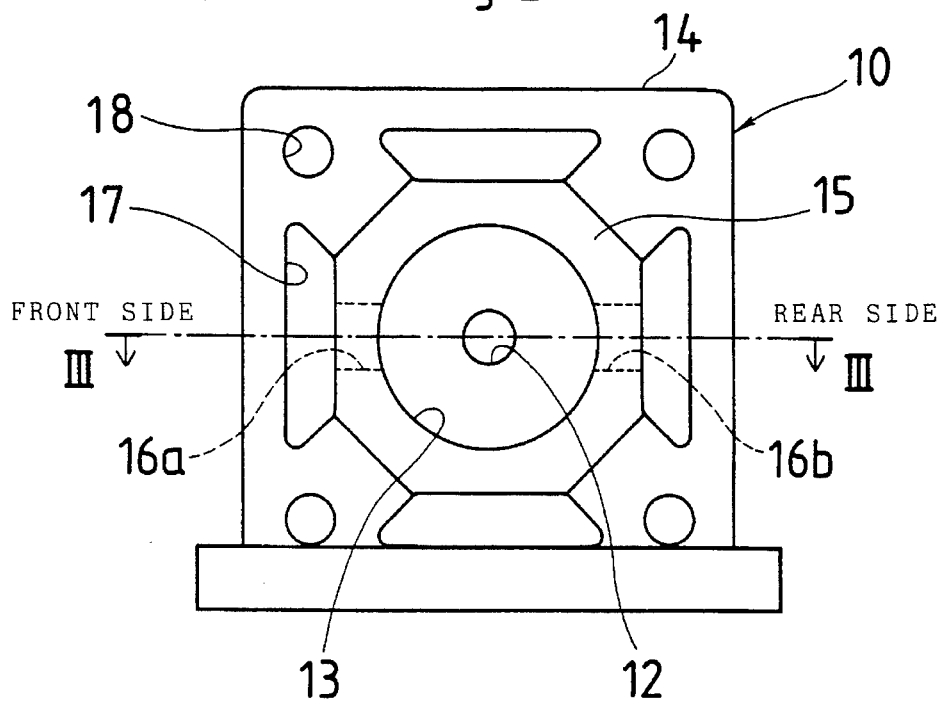
FIG. 2 is a front view showing a stationary platen of the injection molding apparatus shown in FIG. 1.
Figure 3:
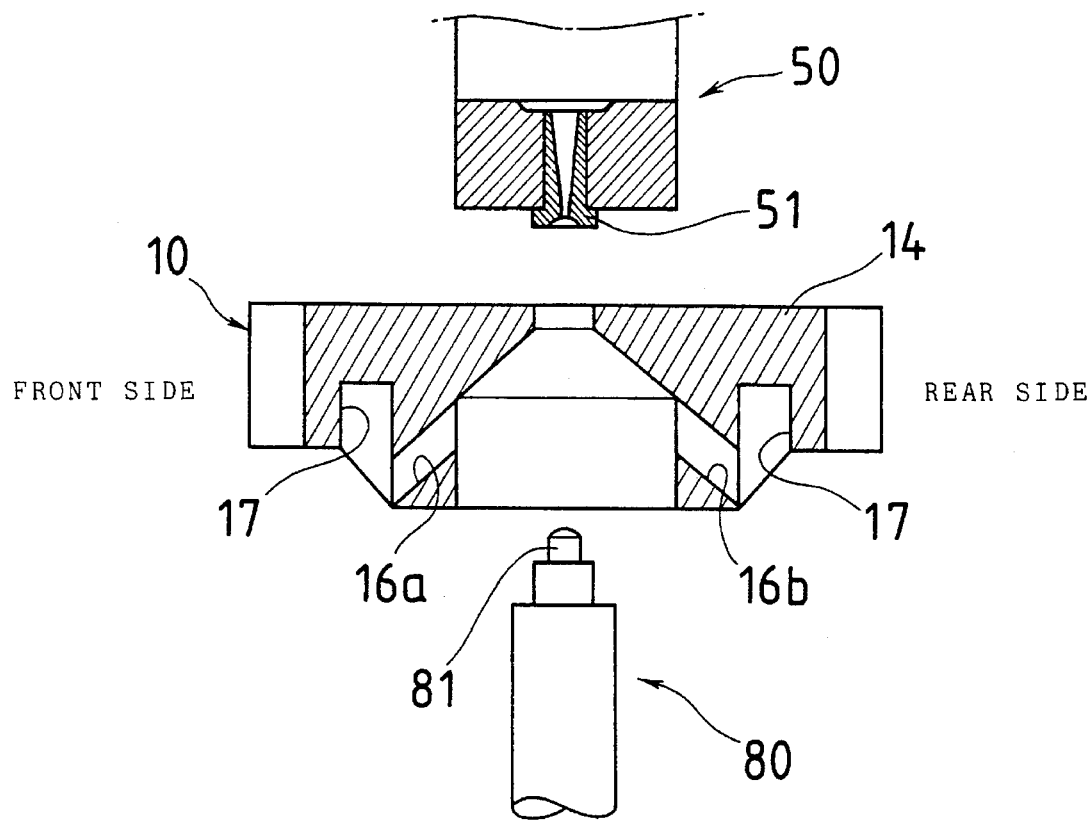
FIG. 3 is a horizontal sectional view taken along a line III—III of FIG. 2.
Figure 4:
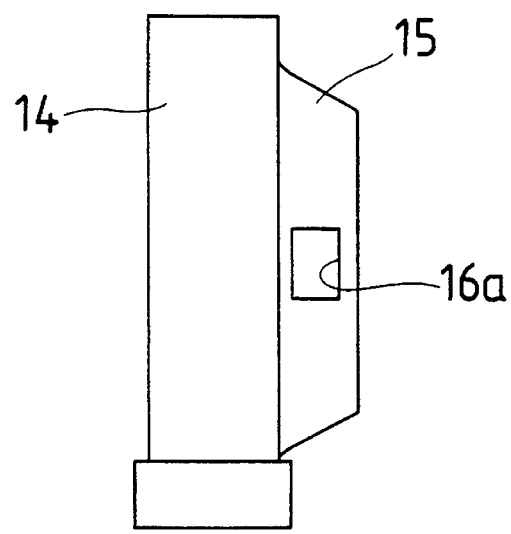
FIG. 4 is a side view showing the stationary platen shown in FIG. 2.

As shown in FIGS. 2 and 3, the stationary platen 10 has a locating hole 12 opening at a central portion thereof on the side close to the movable platen 40 (i.e. a rear side). The main body 14 of the stationary platen 10 includes a guide wall 15, which protrudes on the side of the injection unit 80 (in the forward direction), and the guide bore 13 is formed in the guide wall 15. The guide bore is gradually tapered backward until it comes to communicate with the locating hole 12. The guide wall 15 is provided with two monitoring holes 16a and 16b, the former being a through hole extending from the front side with respect to an operator's position and the latter being a through hole extending from the side opposing the above front side.

The monitoring hole 16a extends straight from the outside of the guide wall 15 toward the locating hole 12 until it reaches the guide bore 13. The monitoring hole 16a has a diameter large enough to allow an operator to look into the locating hole 12 entirely through this monitoring hole 16a from the front side of the clamping unit 70. The monitoring hole 16b provided at the rear side is substantially identical in construction with the monitoring hole 16a provided at the front side except that they are symmetrically disposed.

Several lightening holes 17 are provided around the guide wall 15 to reduce the weight of the stationary platen 10. A reference numeral 18 represents a hole for installing a tie bar.

Upon setting of the dies 50 into the stationary platen 10, the sprue bush 51 of the dies 50 is positioned inside the locating hole 12. Thus, the monitoring holes 16a and 16b enable an operator to monitor the positional relationship between the tip of the injection nozzle 81 of the injection unit 80 and the sprue bush 51, i.e. the nozzle touch condition during the nozzle touch operation. In this case, the operator can monitor the nozzle touch condition from either the front side or the rear side of the clamping unit 70 through the monitoring hole 16*a* or 16*b*. Furthermore, provision of a plurality of monitoring holes will make it easier to monitor the abutting condition between the sprue bush 51 and the injection nozzle 81, because light is introduced inside through a monitoring hole not being used by an operator.

By the way, the condition of abutting between the sprue bush 51 and the injection nozzle 81 can be adjusted by using a jack bolt or a lateral position adjusting bolt (not shown) provided in the injection unit 80 by changing the mutual position between the sprue bush 51 and the injection nozzle 81.

Figure 5:
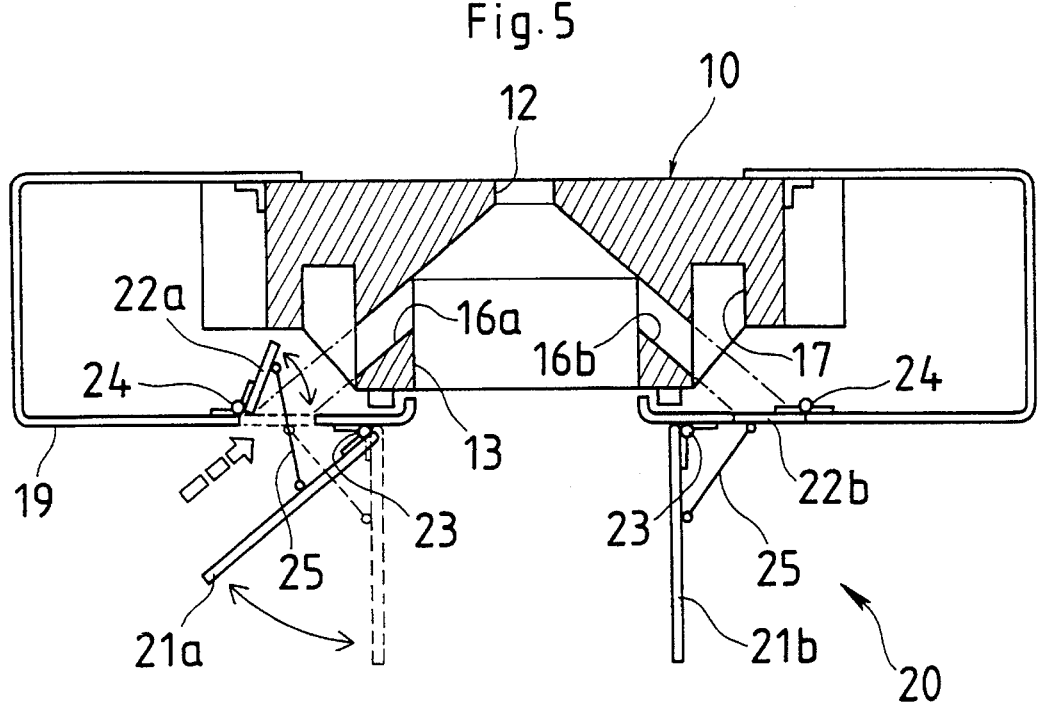
FIG. 5 is a transversal sectional view showing an essential part of an injection molding apparatus in accordance with a second embodiment of the present invention.

Next, a second embodiment of the present invention will be explained with reference to FIG. 5. The stationary platen 10 is provided with a platen cover 19, on which there are provided two door plates 21*a* and 21*b* of a purge shield 20 and two shutters 22*a* and 22*b* for the monitoring holes 16*a* and 16*b*. The door plates 21*a* and 21*b* are supported on the front side of the platen cover 19 at their base ends so as to be rotatable about hinges 23, 23 provided thereon; thus, the guide bore 13 can be covered (closed) on both the front and rear sides. Although not shown in the drawing, there is provided a top board extending on the door plates 21*a* and 21*b*. Overall configuration of the purge shield 20 is a rectangular shape with an open bottom when seen from the front.

The shutters 22*a* and 22*b* are provided on the platen cover 19 in such a manner that the platen cover 19 is partly replaced by the shutters 22*a* and 22*b* at the portions where phantom lines extending from the monitoring holes 16*a* and 16*b* intersect with the platen cover 19, respectively. Each of the shutters 22*a* and 22*b* is swingably supported by a hinge 24.

The door plates 21*a* and 21*b* of the purge shield 20 are connected with the shutters 22*a* and 22*b* by means of thin links 25, 25, respectively. When the door plates 21 take a closed position in which each door plate is normal to the front side of the platen cover 19, the shutters 22 respectively become flush with the surface of the front plate of the platen cover 19. That is, the monitoring holes 16*a* and 16*b* are closed. In general, the purge shield 20 is equipped with limit switches (not shown) for detecting open conditions of the door plates 21*a* and 21*b*, respectively. These limit switches function to prevent the injection unit from performing purge operation.

With above arrangement, only when the door plates 21*a* and 21*b* of the purge shield are opened, i.e. only when the limit switches are activated in response to the opening of the door plates 21*a* and 21*b* to disable the injection unit from performing the purge operation, the shutters 22*a* and 22*b* are opened to allow an operator to look into the monitoring holes 16*a* and 16*b*. Thus, the operator is surely protected from being directly exposed to purged resin or gas while monitoring the abutting condition between the sprue bush 51 and the injection nozzle 81. Furthermore, during the purge operation, not only the door plates 21*a* and 21*b* of the purge shield 20 but the shutters 22*a* and 22*b* are closed, so that neither the gas nor the resin will not leak out of the purge shield 20 during the purge operation.

Figure 6:
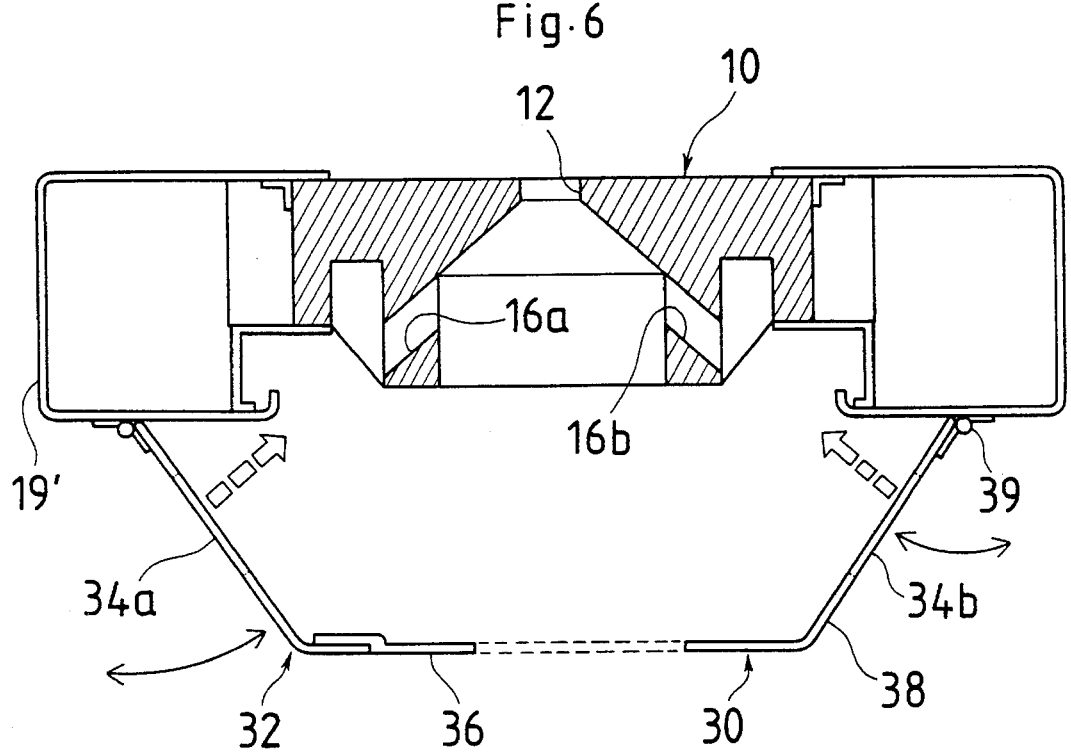
FIG. 6 is a transversal sectional view showing an essential part of an injection molding apparatus in accordance with a third embodiment of the present invention.
Figure 7:
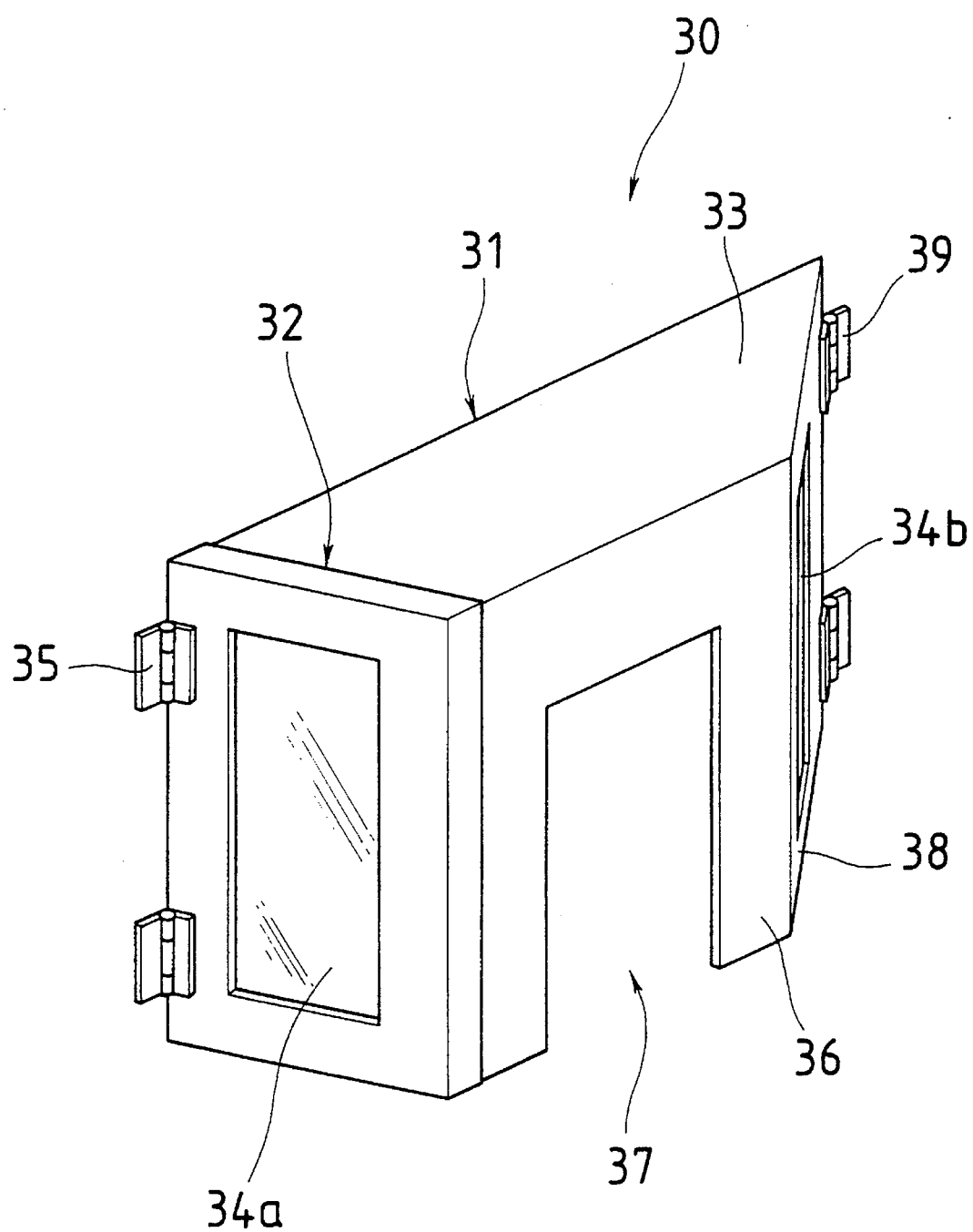
FIG. 7 is a perspective view showing a purge shield shown in the third embodiment of FIG. 6.

Next, a third embodiment of the present invention will be explained with reference to FIGS. 6 and 7. The stationary platen 10 is provided with a platen cover 19'. A purge shield 30 is attached to a front side of the platen cover 19'.

The purge shield 30 consists of a main body 31 and a lid member 32, and its overall configuration is of a truncated pyramid whose top faces forward. As shown in FIG. 7, the purge shield 30 has a top board 33, although neither a rear board nor a bottom board is provided. The lid member 32 constitutes one of side surfaces of the above truncated pyramid and has a window 34*a* of a transparent synthetic resin board. The lid member 32 is attached to the front surface of the platen cover 19' by the hinges 35 so that the lid member is allowed to swingably turn frontward about the hinges. The main body 31 has a front plate 38 which includes an opening 37 to allow a front edge of the cylinder assembly 20 to enter. A side plate 38 has a window 34*b* similar to the window 34*a*. The main body 31 is attached to the front side of the platen cover 19' by hinges 39 so as to be swingable toward the rear side about the hinges.

The purge shield 30 is formed to be large enough to allow phantom lines extending from the monitoring holes 18*a* and 16*b* to intersect with the windows 34*a* and 34*b*. (Refer to FIG. 6)

The above arrangement enables an operator to monitor the abutting condition between the sprue bush 51 and the injection nozzle 81 from the windows 34*a* and 34*b* through the monitoring holes 16*a* and 18*b* even if the injection unit 20 is in a purge operation.

The present invention is not limited to the embodiments disclosed by the drawings. For example, the monitoring holes 16*a* and 16*b* may be provided only in the front side of the clamping unit 70. Furthermore, in the second embodiment, if the door plates 21*a* and 21*b* of the purge shield have sizes as large as covering the monitoring holes 16*a* and 16*b* when opened, the door plates 21*a* and 21*b* themselves may be made of transparent material so that an operator become able to look into the monitoring holes 16*a*, 16*b* through the transparent door plates 21*a*, 21*b*. Furthermore, in the same embodiment, the links 25, 25 may be omitted, and the shutters 22*a* and 22*b* of the purge shield 20 can be made of transparent material so as to allow an operator to look into the monitoring holes through these transparent windows.

The present invention enables an operator to perform the nozzle touch operation while monitoring the abutting condition between the sprue bush of the dies and the nozzle tip of the injection unit. Thus, the nozzle touch operation can be performed accurately. Even if the thickness of the stationary platen increases, the monitoring of the nozzle touch operation can be done easily. Furthermore, the nozzle touch operation can be monitored without the danger of being exposed to the purged gas and resin during the purge operation and the gas and resin are prevented to leak outside through the monitoring holes during the purge operation.

We claim:

1. An injection molding apparatus comprising:

a clamping unit, for holding dies therebetween, comprising:
    a movable platen, and
    a stationary platen;

said stationary platen comprising:
    a first hole, serving as a locating hole, into which a sprue of the dies is located, and
    a second hole, serving as a monitoring hole, extending from a side of said stationary platen toward said first hole, whereby the first hole of said stationary platen is monitored from the side of the clamping unit through said second hole, wherein said second hole extends from the side of the stationary platen, which confronts an operator position, to the opposite side of the stationary platen and slopes toward said locating hole.

2. An injection molding apparatus in accordance with claim 1, wherein said clamping unit further comprises:

a platen cover surrounding said stationary platen; and a purge shield,
mounted to said platen cover between said operator position and said stationary platen and being selectively opened and closed, said platen cover having a shutter facing to said second hole, and said shutter being opened and closed in response to opening and closing motions of said purge shield, whereby said first hole is monitored through said second hole when said shutter is opened.

3. An injection molding apparatus in accordance with claim 1, wherein said clamping unit further comprises a purge shield disposed between said operator position and said stationary platen, said purge shield provided with a window, whereby said first hole is monitored through said window of the purge shield and said second hole.

4. An injection molding apparatus in accordance with claim 3, wherein said clamping unit comprises a platen cover surrounding said stationary platen, and said purge shield is attached to said platen cover.

5. An injection molding apparatus in accordance with claim 1, further comprising a plurality of second holes which serve as monitoring holes.

6. An injection molding apparatus comprising:

a clamping unit, for holding dies therebetween, comprising:
a movable platen, and
a stationary platen;

said stationary platen comprising:
a first hole, serving as a locating hole, into which a sprue of the dies is located, and
a second hole, serving as a monitoring hole, extending from a side of said stationary platen toward said first hole, whereby the first hole of said stationary platen is monitored from the side of the clamping unit through said second hole;
a platen cover surrounding said stationary platen; and
a purge shield mounted to said platen cover between said operator position and said stationary platen and being selectively opened and closed, said platen cover having a shutter facing to said second hole, and said shutter being opened and closed in response to opening and closing motions of said purge shield, whereby said first hole is monitored through said second hole when said shutter is opened.

* * * * *

UNITED STATES PATENT AND TRADEMARK OFFICE
CERTIFICATE OF CORRECTION

PATENT NO. : 5,460,505
DATED : October 24, 1995
INVENTOR(S) : ITO et al.

It is certified that error appears in the above-indentified patent and that said Letters Patent is hereby corrected as shown below:

Col. 4, line 10, change "38" to --36--;
      line 17, change "18" to --16--.

Signed and Sealed this

Twenty-third Day of January, 1996

Attest:

BRUCE LEHMAN

*Attesting Officer*    *Commissioner of Patents and Trademarks*